US010588444B2

(12) United States Patent  
Kiriishi et al.

(10) Patent No.: US 10,588,444 B2  
(45) Date of Patent: Mar. 17, 2020

(54) HEATING COOKER

(71) Applicant: Panasonic Intellectual Property Management Co., Ltd., Osaka-shi, Osaka (JP)

(72) Inventors: Taku Kiriishi, Shiga (JP); Katsuyuki Ohta, Shiga (JP); Hiroaki Nitta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 278 days.

(21) Appl. No.: 14/780,837

(22) PCT Filed: Apr. 3, 2014

(86) PCT No.: PCT/JP2014/001935  
§ 371 (c)(1),  
(2) Date: Sep. 28, 2015

(87) PCT Pub. No.: WO2014/162743  
PCT Pub. Date: Oct. 9, 2014

(65) Prior Publication Data  
US 2016/0073814 A1 Mar. 17, 2016

(30) Foreign Application Priority Data

Apr. 4, 2013 (JP) .................. 2013-078289  
Sep. 25, 2013 (JP) .................. 2013-197771  
Sep. 25, 2013 (JP) .................. 2013-197772

(51) Int. Cl.  
*A47J 27/04* (2006.01)  
*A47J 27/00* (2006.01)  
(Continued)

(52) U.S. Cl.  
CPC ............ *A47J 27/04* (2013.01); *A47J 27/004* (2013.01); *A47J 37/015* (2013.01); *A47J 43/0722* (2013.01); *A47J 2027/043* (2013.01)

(58) Field of Classification Search  
CPC .... A47J 2027/043; A47J 27/004; A47J 27/04; A47J 37/015; A47J 43/0722;  
(Continued)

(56) References Cited

U.S. PATENT DOCUMENTS 4,202,257 A * 5/1980 Masuda .................. F24C 15/18  
99/348  
4,202,258 A * 5/1980 Masuda .................. A21B 7/005  
219/489  
(Continued)

FOREIGN PATENT DOCUMENTS

JP 63-58571 B2 11/1988  
JP 5-38828 Y2 9/1993  
(Continued)

OTHER PUBLICATIONS

International Search Report, and English language translation thereof, in corresponding International Application No. PCT/JP2014/001935, dated Jun. 17, 2014, 4 pages.  
(Continued)

*Primary Examiner* — Tu B Hoang  
*Assistant Examiner* — Vy T Nguyen  
(74) *Attorney, Agent, or Firm* — Brinks Gilson & Lione

(57) ABSTRACT

A heating cooker of the invention includes a blade rotating in first and second rotation directions around a rotation axle in the cooking container to stir a heating-target object put in the cooking container, the blade including a first functional portion pressing the heating-target object toward a side wall of the cooking container when rotating in the first rotation direction, and a second functional portion pressing the  
(Continued)

heating-target object not toward the side wall of the cooking container when rotating in the second rotation direction.

13 Claims, 10 Drawing Sheets

(51) Int. Cl.
  *A47J 43/07* (2006.01)
  *A47J 37/01* (2006.01)

(58) Field of Classification Search
  CPC ....... A21B 7/005; A21C 1/02; B01F 13/1044; B01F 2013/1086; B01F 7/162; B01F 7/1675
  USPC .................. 99/348, 352, 371, 409; 219/400; 366/304, 306, 309; 426/438, 519, 523
  See application file for complete search history.

(56) References Cited

U.S. PATENT DOCUMENTS

| | | | | |
|---|---|---|---|---|
| 5,510,127 | A * | 4/1996 | Wong ..................... | A21B 7/005 426/19 |
| 6,101,928 | A * | 8/2000 | Kakimoto .............. | A21B 7/005 366/98 |
| 7,993,694 | B2 * | 8/2011 | Goderiaux ............ | A47J 36/165 426/438 |
| 2010/0147160 | A1 * | 6/2010 | Oochi ...................... | A21C 1/02 99/348 |
| 2012/0125207 | A1 * | 5/2012 | Taguchi ................. | A21B 7/005 99/348 |
| 2012/0240788 | A1 * | 9/2012 | Ito .......................... | A21B 7/005 99/348 |

FOREIGN PATENT DOCUMENTS

| | | |
|---|---|---|
| JP | 7-148074 A | 6/1995 |
| JP | 2004-261247 A | 9/2004 |
| JP | 2004-305344 A | 11/2004 |
| JP | 2011-50576 A | 3/2011 |
| JP | 4822962 B2 | 11/2011 |
| JP | 5032693 B2 | 9/2012 |
| WO | WO 03/073860 A1 | 9/2003 |
| WO | WO 2012/056763 A1 | 5/2012 |

OTHER PUBLICATIONS

International Preliminary Report on Patentability, and English language translation thereof, in corresponding International Application No. PCT/JP2014/001935, dated Oct. 15, 2015, 5 pages.

* cited by examiner

HEATING COOKER

This application is a 371 application of PCT/JP2014/001935 having an international filing date of Apr. 3, 2014, which claims priority to JP 2013-078289 filed Apr. 4, 2013, JP 2013-197771 filed Sep. 25, 2013 and JP 2013-197772 filed Sep. 25, 2013, the entire contents of which are incorporated herein by reference.

TECHNICAL FIELD

The invention relates to a heating cooker stirring and cooking a heating-target object.

BACKGROUND ART

A household automatic bread maker has hitherto been most commonly known as a heating cooker including a stirring function (see, e.g., Patent Document 1). This kind of heating cookers includes a rice cooker configured to stir rice grains at the time of rice washing and rice cooking to achieve uniform water absorption and heating (see, e.g., Patent Document 2) and a multifunctional heating cooker configured to be capable of both rice cooking and breadmaking (see, e.g., Patent Documents 3, 4). These heating cookers are normally configured to rotate a blade for stirring in a cooking container to perform operations of "mixing" or "kneading" a heating-target object.

PRIOR ART DOCUMENT

Patent Document 1: Japanese Examined Patent publication No. 1988-058571
Patent Document 2: Japanese Patent No. 5032693
Patent Document 3: Japanese Patent No. 4822962
Patent Document 4: Japanese Unexamined Patent publication No. 2004-261247

SUMMARY OF THE INVENTION

Problem to be Solved by the Invention

However, when bread is made by using a conventional heating cooker, rotation of a blade may tear and damage bread dough in a degassing process for removing gas present in bread dough after fermentation, for example. This leads to deterioration in expansion of bread in a baking process. When rice is cooked by using a conventional heating cooker, rotation of a blade may crush and damage rice grains in a temperature raising process for putting water in a cooking container into a boiling state, for example.

It is an object of the invention to solve the conventional problems and to provide a heating cooker capable of suppressing damage of a heating-target object due to rotation of the blade.

Means to Solve the Problem

To achieve the object, a heating cooker according to the invention is a heating cooker comprising: a cooking container housed in a heating chamber disposed inside a device main body; and a blade rotating in first and second rotation directions around a rotation axle in the cooking container to stir a heating-target object put in the cooking container, the blade including a first functional portion pressing the heating-target object toward a side wall of the cooking container when rotating in the first rotation direction, and a second functional portion pressing the heating-target object not toward the side wall of the cooking container when rotating in the second rotation direction.

Effect of the Invention

The heating cooker according to the invention can suppress the damage of the heating-target object due to the rotation of the blade.

BRIEF DESCRIPTION OF THE DRAWINGS

These aspects and features of the invention will be apparent from the following description concerning a preferred embodiment with respect to the accompanying drawings, in which.

DETAILED DESCRIPTION OF THE PREFERRED EMBODIMENTS

Knowledge Underlying the Present Invention

Figure 1:
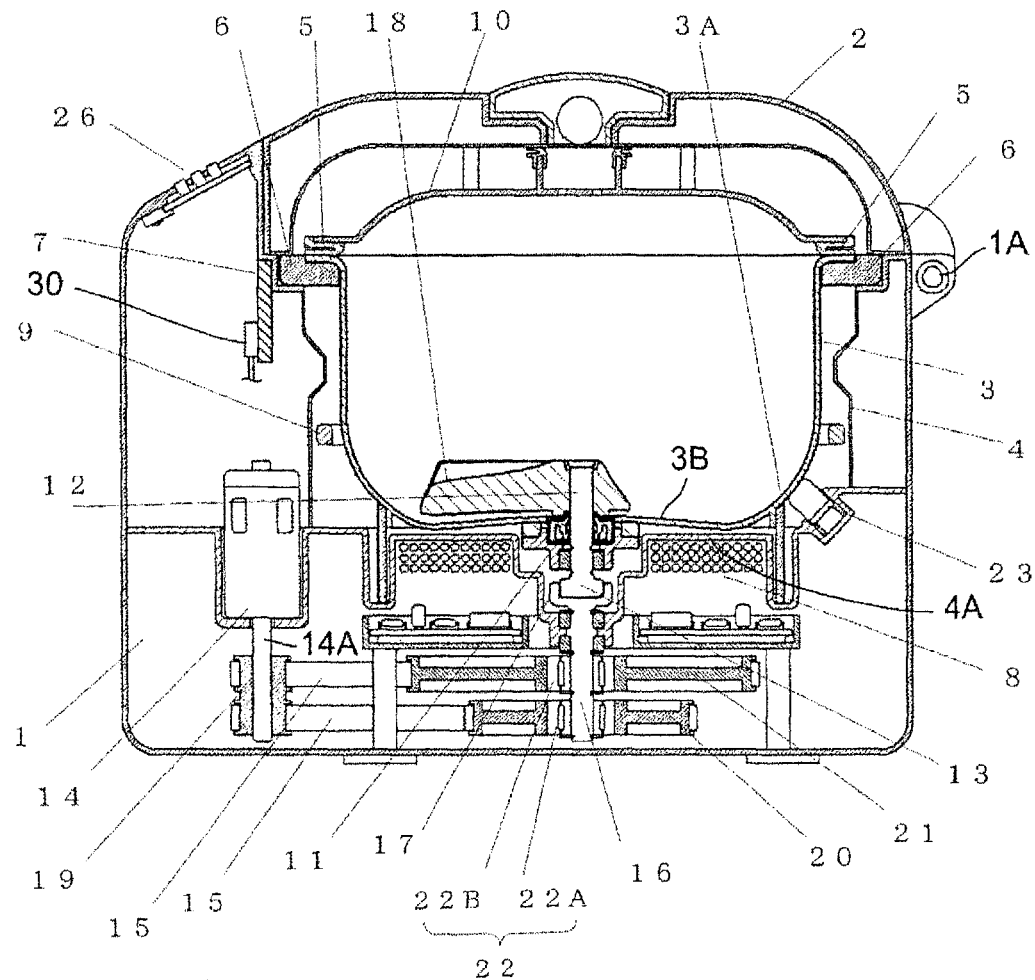
FIG. 1 is a cross-sectional view of a rice cooking state of a heating cooker according to an embodiment of the invention.

As a result of intensive studies on causes of damage of a heating-target object due to rotation of a blade in a conventional heating cooker, the present inventors acquired the following knowledge.

When bread is made by using the conventional heating cooker, a blade is normally rotated in processes such as a kneading process of cooking ingredients and a degassing process after fermentation of bread dough. The kneading process requires a strong force for kneading dough. On the other hand, in the degassing process, a force must be applied so as not to damage gluten generated in bread dough. In this regard, the conventional heating cooker has a rotating force of the blade set even in the degassing process to a strong rotating force preferable for the kneading process. The present inventors found out that this fact is a cause of tearing and damaging of bread dough due to the rotation of the blade and deterioration in expansion of bread in a subsequent baking process.

On the other hand, when rice is cooked by the conventional heating cooker, the blade is normally rotated in processes such as a rice washing process, a water soaking process, and a temperature raising process. The rice washing process requires a strong force for pressing rice grains toward a side wall of a cooking container to rub the rice grains with each other. On the other hand, in the water soaking process and the temperature raising process, a force must be applied so as not to damage the rice grains softened by heating. In this regard, the conventional heating cooker has a rotating force of the blade set even in the water soaking process and the temperature raising process to a strong rotating force preferable for the rice washing process. The present inventors found out that this fact is a cause of crushing and damaging of rice grains due to the rotation of the blade.

A conceivable method of solving these problems is to simply reduce the rotation speed of the blade. To reduce the rotation speed of the blade, for example, it is conceivable that an inverter motor is used as a rotation drive motor generating a drive force of the blade. However, since the inverter motor is expensive, it is desirable to use an inexpensive motor such as an induction motor. If the induction motor is used, the induction motor can intermittently be driven to reduce an apparent rotation speed of the blade. However, since a circumferential speed is not changed, kinetic energy applied to the heating-target object is still large. Therefore, the damage of the heating-target object due to the rotation of the blade cannot sufficiently be suppressed.

As a result of intensive studies based on the novel knowledge, the inventors have accomplished the inventions as below.

According to a first aspect of the invention, there is provided a heating cooker comprising: a cooking container housed in a heating chamber disposed inside a device main body; and a blade rotating in first and second rotation directions around a rotation axle in the cooking container to stir a heating-target object put in the cooking container, the blade including a first functional portion pressing the heating-target object toward a side wall of the cooking container when rotating in the first rotation direction, and a second functional portion pressing the heating-target object not toward the side wall of the cooking container when rotating in the second rotation direction.

This configuration can switch the rotation direction of the blade to switch whether the heating-target object is pressed toward the side wall of the cooking container. Therefore, if a strong force must be applied to the heating-target object as in the case of the kneading process and the rice washing process, the heating-target object can be pressed by the first functional portion toward the side wall of the cooking container and can be moved to between the side wall of the cooking container and the blade. As a result, a strong pressure can be applied to the heating-target object. On the other hand, if the heating-target object may be damaged as in the case of the degassing process and the temperature raising process, the heating-target object can be pressed by the second function unit not toward the side wall of the cooking container so as not to apply a strong pressure to the heating-target object. This enables suppression of damage of the heating-target object due to the rotation of the blade.

According to a second aspect of the invention, there is provided the heating cooker of the first aspect, wherein the second functional portion is configured to press the heating-target object toward a center region of the cooking container.

According to a third aspect of the invention, there is provided the heating cooker of the first or second aspect, wherein an upper portion of the blade has a horizontal cross-sectional area made gradually smaller from a bottom to a top.

According to a fourth aspect of the invention, there is provided the heating cooker of the third aspect, wherein the upper portion of the blade has a substantially elliptical frustum shape.

According to a fifth aspect of the invention, there is provided the heating cooker of any one of the first to fourth aspects, wherein the first functional portion has a convex shape curved toward a front side in the first rotation direction relative to a straight line passing through the rotation axle of the blade and a rotation tip position of the blade in a plane view, and the second functional portion has a concave shape curved toward a rear side in the second rotation direction relative to a straight line passing through the rotation axle of the blade and the rotation tip position of the blade in a plane view.

According to a sixth aspect of the invention, there is provided the heating cooker of any one of the first to fifth aspects, wherein the first functional portion has an inclined surface having an inclination angle made gradually larger within a range of 45 to 90 degrees relative to a horizontal direction from the rotation axle of the blade toward a rotation tip position of the blade.

According to a seventh aspect of the invention, there is provided the heating cooker of any one of the first to sixth aspects, wherein the second functional portion has an inclined surface having an inclination angle made gradually smaller within a range of 0 to 60 degrees relative to a horizontal direction from the rotation axle of the blade toward a rotation tip position of the blade followed by the inclination angle made gradually lager and the inclination angle made drastically larger in a vicinity of the rotation tip position.

According to an eighth aspect of the invention, there is provided the heating cooker of any one of the first to seventh aspects, wherein, in a vertical cross section, the second functional portion has a concave shape curved toward the inside of the blade relative to a straight line connecting an upper end portion and a lower end portion, the vertical cross section being orthogonal to a vertical cross section passing through the rotation axle of the blade and a rotation tip position of the blade.

According to a ninth aspect of the invention, there is provided the heating cooker of any one of the first to eighth aspects, wherein the blade is configured to rotate in the first rotation direction in a rice washing process and to rotate in the second rotation direction in at least one process of a water soaking process, a temperature raising process, a boiling maintaining process, a steaming process, and a loosening process after completion of rice cooking.

According to a tenth aspect of the invention, there is provided the heating cooker of any one of the first to ninth aspects, wherein the blade is configured to rotate in the first rotation direction in a kneading process and to rotate in the second rotation direction in a degassing process.

According to an 11th aspect of the invention, there is provided the heating cooker of any one of the first to eighth aspects, wherein the blade is configured to rotate in the first rotation direction at the time of bread-making and to rotate in the second rotation direction at the time of rice cooking.

According to a 12th aspect of the invention, there is provided the heating cooker of any one of the first to 11th, further comprising a rotation drive motor generating a drive force of the blade, a rotation shaft coupled to the rotation axle of the blade, first and second driven units having rotation ratios different from each other, rotating in the first rotation direction when an output shaft of the rotation drive motor rotates in a forward direction, and rotating in the second rotation direction when the output shaft of the rotation drive motor rotates in a reverse direction, a first one-way clutch transmitting a rotating force of the first driven unit to the rotation shaft when the first driven unit rotates in the first rotation direction and transmitting no rotating force of the first driven unit to the rotation shaft when the first driven unit rotates in the second rotation direction, and a second one-way clutch transmitting no rotating force of the second driven unit to the rotation shaft when the second driven unit rotates in the first rotation direction and transmitting a rotating force of the second driven unit to the rotation shaft when the second driven unit rotates in the second rotation direction.

According to a 13th aspect of the invention, there is provided the heating cooker of the 12th aspect, wherein the first driven unit includes a small-diameter pulley attached via the first one-way clutch to the rotation shaft such that a drive force of the rotation drive motor is transmitted via a drive belt put around a pulley attached to the output shaft of the rotation drive motor and the small-diameter pulley, and wherein the second driven unit includes a large-diameter pulley attached via the second one-way clutch to the rotation shaft such that a drive force of the rotation drive motor is transmitted via a drive belt put around a pulley attached to the output shaft of the rotation drive motor and the large-diameter pulley.

According to a 14th aspect of the invention, there is provided the heating cooker of any one of the first to 13th aspects, wherein a lower portion of the blade facing a bottom wall of the cooking container is configured to incline or curve such that a distance from the bottom wall of the cooking container increases toward an outer circumferential portion of the blade.

According to a 15th aspect of the invention, there is provided the heating cooker of the 14th aspect, wherein an upper portion of the blade is connected to the lower portion of the blade through a portion inclined downward relative to a horizontal direction.

An embodiment of the invention will now be described with reference to the drawings. The invention is not limited by this embodiment.

Embodiment

A heating cooker according to the embodiment of the invention is a heating cooker having both a rice cooking function for cooking rice and a bread-making function for making bread. FIG. 1 is a cross-sectional view of a rice cooking state of the heating cooker according to the embodiment of the invention.

In FIG. 1, the heating cooker according to the embodiment includes a substantially bottomed-cylindrical device main body 1. A portion of an upper surface of the device main body 1 is disposed with an operation panel 26 that is an example of an operation unit.

The operation panel 26 includes operation keys and a display unit. The operation keys include, for example, a rice washing key, a start key, a cancel key, a timer key, a reservation key, a selection key selecting a cooking course such as a rice cooking course and a bread-making course, etc. The display unit includes, for example, a liquid crystal display panel and displays a time, details set by the operation keys, an error, etc.

A heating chamber 4 is disposed inside the device main body 1. The heating chamber 4 has a box shape with an upper surface opened. A cooking container 3 containing a heating-target object such as rice, water, and breadstuff is detachably housed inside the heating chamber 4. A flange portion 5 protruding outward is disposed around an upper opening portion of the cooking container 3. Handles 6 made of, for example, heat resistant resin are attached to the left and right of the flange portion 5. The handles 6 are formed to be engageable with a concave rotation stopping portion 7 disposed in an upper opening portion of the heating chamber 4. As depicted in FIG. 1, the handles 6 are engaged with the rotation stopping portion 7 and the cooking container 3 is circumferentially non-rotatably held in the heating chamber 4.

As depicted in FIG. 1, a sheath heater 9 is an example of a side-surface heating unit heating the cooking container 3 and is disposed inside the heating chamber 4 along with a temperature sensor 23 that is an example of a temperature detecting unit detecting a temperature in the cooking container 3. The sheath heater 9 is disposed in a substantially annular shape surrounding a side portion of the cooking container 3 housed in the heating chamber 4 such that a gap is formed.

An induction heating coil 8 is an example of a lower heating unit and is disposed outside a bottom portion of the heating chamber 4. The induction heating coil 8 heats the cooking container 3 at least partially containing a magnetic material such as stainless steel through electromagnetic induction. In this embodiment, the sheath heater 9 and the induction heating coil 8 make up a heating apparatus heating the cooking container 3.

The upper opening portion of the heating chamber 4 is opened and closed by a lid 2 disposed on an upper portion of the device main body 1. The lid 2 is rotatably attached to a hinge unit 1A disposed on an upper rear portion of the device main body 1 (on the right upper side of FIG. 1).

Figure 9:
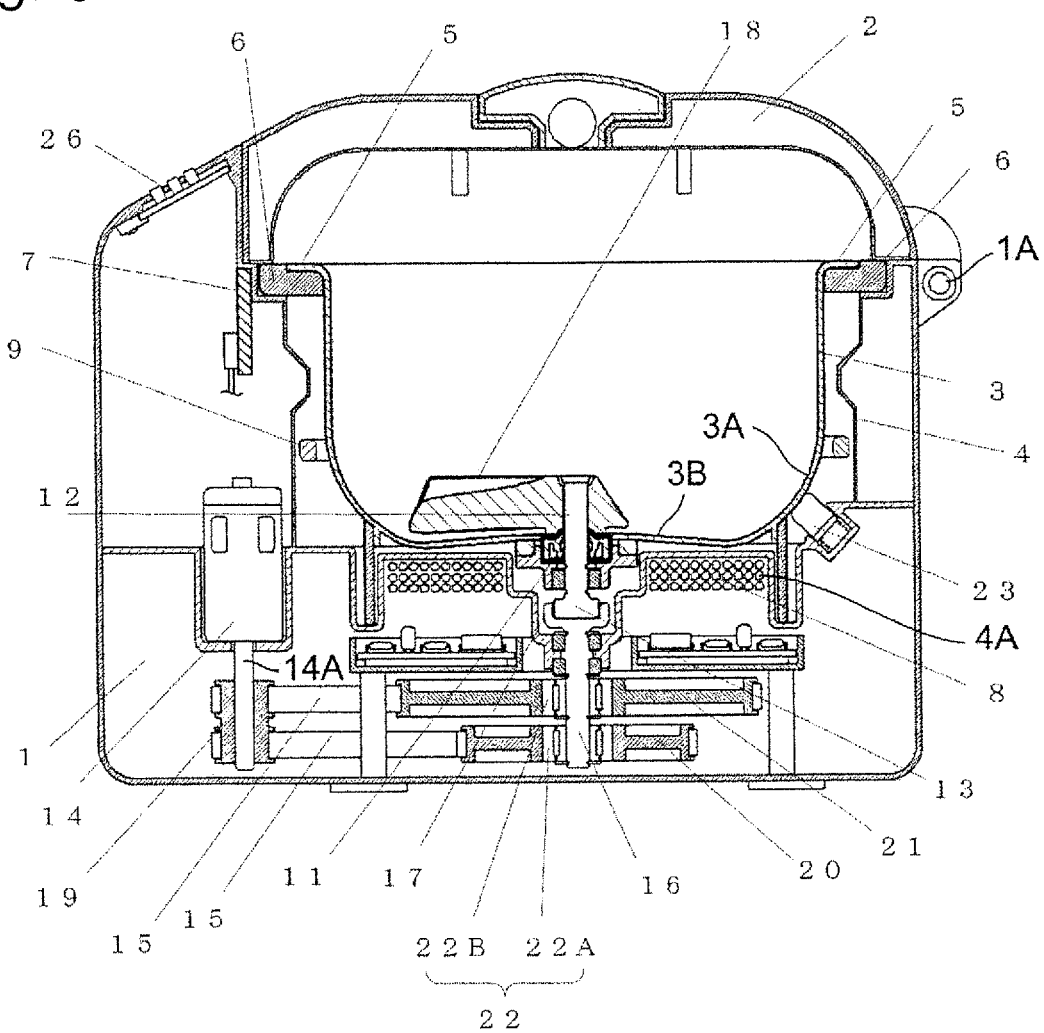
FIG. 9 is a cross-sectional view of a bread-making state of the heating cooker of FIG. 1.

An inner lid 10 is detachably attached inside the lid 2 and comes into contact with the flange portion 5 of the cooking container 3 to close the upper opening portion of the cooking container 3 at the time of rice cooking. The inner lid 10 is removed at the time of bread-making as depicted in FIG. 9.

A space allowing air convection is disposed between the inner lid 10 and the lid 2. Into this space, a thermal convection flow generated from the sheath heater 9 flows through a gap between the flange portion 5 of the cooking container 3 and a side wall upper portion of the heating chamber 4. The inner lid 10 is warmed by the thermal convection flow flowing into this space. The heating cooker according to this embodiment may further include a fan (not depicted) for facilitating the generation of the thermal convection flow. As a result, the cooking container 3 and the inner lid 10 can entirely and effectively be warmed.

A bearing 11 is disposed in a substantially center portion of a bottom wall 3B of the cooking container 3. The bearing 11 is disposed to rotatably support a rotation axle 12 penetrating the substantially center portion of the bottom wall 3B of the cooking container 3. A blade 18 for stirring the heating-target object is detachably attached inside the cooking container 3 to an upper end portion of the rotation axle 12. An upper coupling 13 is attached to a lower end portion of the rotation axle 12 located outside the cooking container 3.

The upper coupling 13 is configured to be engageable with a lower coupling 17 disposed to protrude downward in a substantially center portion of a bottom portion 4A of the heating chamber 4. By engaging the upper coupling 13 with the lower coupling 17, the cooking container 3 is set at a predetermined position in the heating chamber 4. When the upper coupling 13 and the lower coupling 17 rotates in the engaged state, the rotation axle 12 and the blade 18 are rotated. The lower coupling 17 is attached to an upper end portion of a rotation shaft 16. Therefore, the rotation axle 12 and the rotation shaft 16 are coupled by engaging the upper coupling 13 with the lower coupling 17.

A first driven unit 20 is attached via a first one-way clutch 22A to an outer circumferential surface of a lower end portion of the rotation shaft 16. The first one-way clutch 22A is configured to transmit a rotating force of the first driven unit 20 to the rotation shaft 16 when the first driven unit 20 rotates in a first rotation direction (e.g., clockwise). On the other hand, the first one-way clutch 22A is configured to transmit no rotating force of the first driven unit 20 to the rotation shaft 16 when the first driven unit 20 rotates in a second rotation direction (e.g., counterclockwise).

A second driven unit 21 is attached via a second one-way clutch 22B to the outer circumferential surface of the rotation shaft 16 between the first driven unit 20 and the lower coupling 17. The second one-way clutch 22B is configured to transmit no rotating force of the second driven unit 21 to the rotation shaft 16 when the second driven unit 21 rotates in the first rotation direction. On the other hand, the second one-way clutch 22B is configured to transmit a rotating force of the second driven unit 21 to the rotation shaft 16 when the second driven unit 21 rotates in the second rotation direction.

The first driven unit 20 and the second driven unit 21 are connected via respective drive belts 15 to a drive unit 19. The drive unit 19 includes a pulley, for example, and is attached to an outer circumferential surface of an output shaft 14A of a rotation drive motor 14. The rotation drive motor 14 is a motor generating a drive force of the blade 18. The rotation drive motor 14 is a motor capable of rotating the output shaft 14A in forward and reverse directions. When the output shaft 14A of the rotation drive motor 14 rotates in the forward direction, the first and second driven units 20, 21 rotate in the first rotation direction. On the other hand, when the output shaft 14A of the rotation drive motor 14 rotates in the reverse direction, the first and second driven units 20, 21 rotate in the second rotation direction.

The first driven unit 20 and the second driven unit 21 are configured to have rotation ratios different from each other. For example, the first driven unit 20 includes a small-diameter pulley and the second driven unit 21 includes a large-diameter pulley having a larger number of teeth than the first driven unit 20.

The drive belt 15 is put around the small-diameter pulley of the first driven unit 20 and the pulley of the drive unit 19. When the output shaft 14A of the rotation drive motor 14 is rotated forward or reversely, the drive force of the rotation drive motor 14 is transmitted via the drive belt 15 to the small-diameter pulley of the first driven unit 20 and the small-diameter pulley rotates. When the small-diameter pulley rotates in the first rotation direction, the first one-way clutch 22A transmits a rotating force of the small-diameter pulley to the rotation shaft 16 and the rotation axle 12, and the blade 18 rotates at high speed in the first rotation direction.

The drive belt 15 is put around the large-diameter pulley of the second driven unit 21 and the pulley of the drive unit 19. When the output shaft 14A of the rotation drive motor 14 is rotated forward or reversely, the drive force of the rotation drive motor 14 is transmitted via the drive belt 15 to the large-diameter pulley of the second driven unit 21 and the large-diameter pulley rotates. When the large-diameter pulley rotates in the second rotation direction, the second one-way clutch 22B transmits a rotating force of the large-diameter pulley to the rotation shaft 16 and the rotation axle 12, and the blade 18 rotates at low speed in the second rotation direction.

The temperature sensor 23 for detecting the temperature of the cooking container 3 is disposed in the vicinity of the bottom portion 4A of the heating chamber 4. When the cooking container 3 is set at the predetermined position in the heating chamber 4, the temperature sensor 23 comes into contact with an outer surface of the cooking container 3 to detect the temperature of the cooking container 3.

A control unit 30 is disposed outside the heating chamber 4 and inside the device main body 1. The control unit 30 stores cooking sequences corresponding to a plurality of cooking courses. A cooking sequence refers to a program of a cooking procedure having the energizing times and the controlled temperatures of the induction heating coil 8 and the sheath heater 9, the rotation direction and the rotation speed of the rotation drive motor 14, etc. in each process determined in advance for performing the rice cooking process or the bread-making process in order. The control unit 30 controls the drive of the induction heating coil 8, the sheath heater 9, and the rotation drive motor 14 based on the cooking sequence corresponding to a certain cooking course selected on the operation panel 26 and the detected temperature of the temperature sensor 23.

Figure 2:
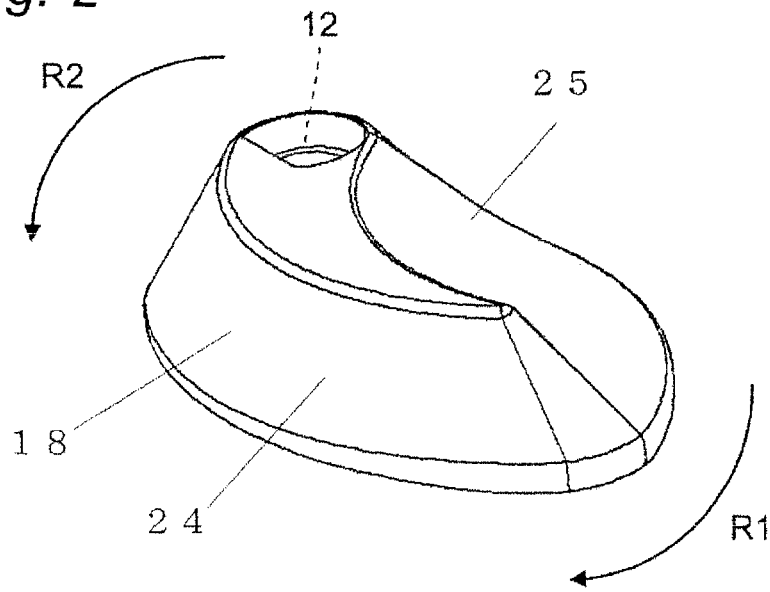
FIG. 2 is a perspective view of a blade included in the heating cooker of FIG. 1.
Figure 3:
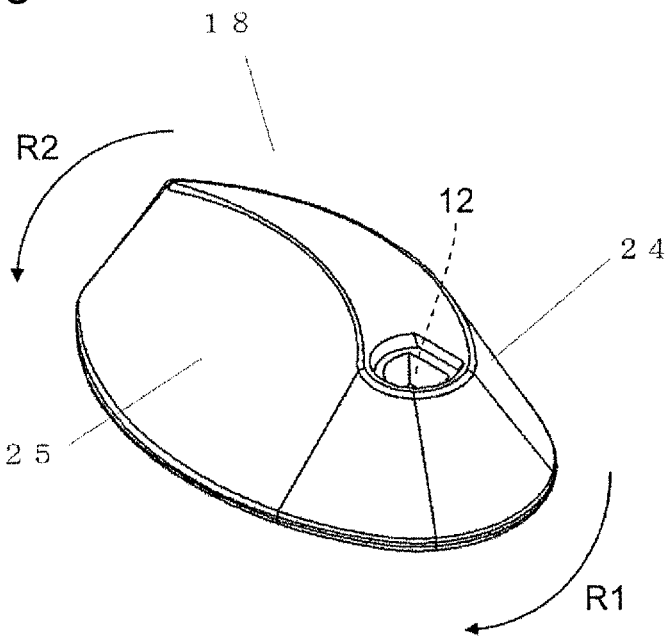
FIG. 3 is a perspective view of the blade included in the heating cooker of FIG. 1 viewed from an angle different from FIG. 2.
Figure 4A:
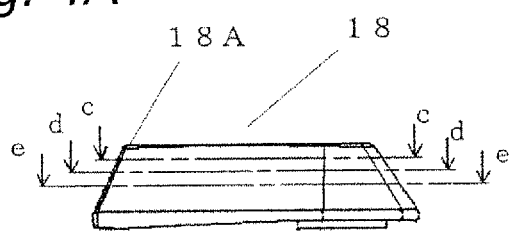
FIG. 4A is a side view of the blade included in the heating cooker of FIG. 1.
Figure 4B:
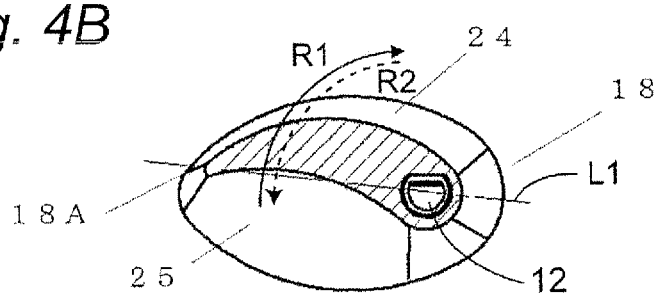
FIG. 4B is a cross-sectional view taken along a line c-c of FIG. 4A.
Figure 4C:
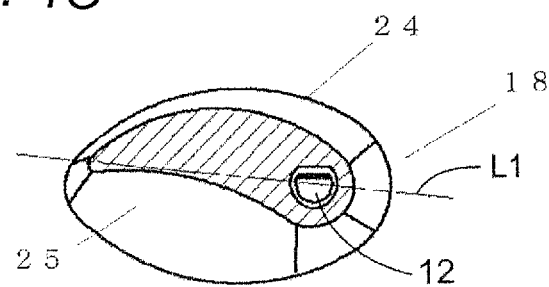
FIG. 4C is a cross-sectional view taken along a line d-d of FIG. 4A.
Figure 4D:
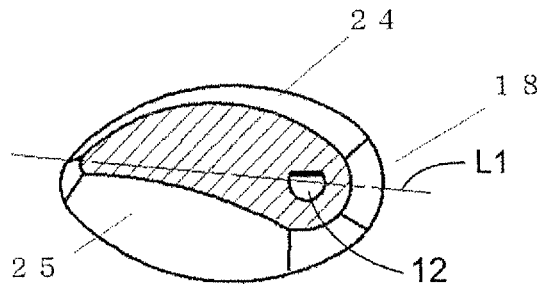
FIG. 4D is a cross-sectional view taken along a line e-e of FIG. 4A.
Figure 5A:
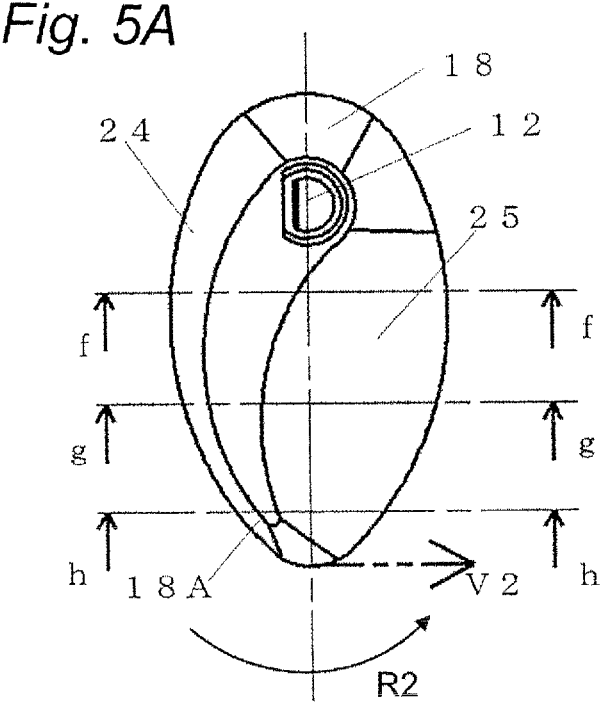
FIG. 5A is a plan view of the blade included in the heating cooker of FIG. 1.
Figure 5B:
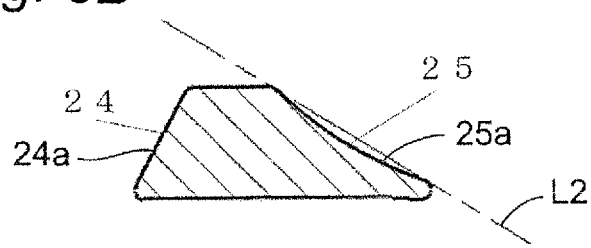
FIG. 5B is a cross-sectional view taken along a line f-f of FIG. 5A.
Figure 5C:
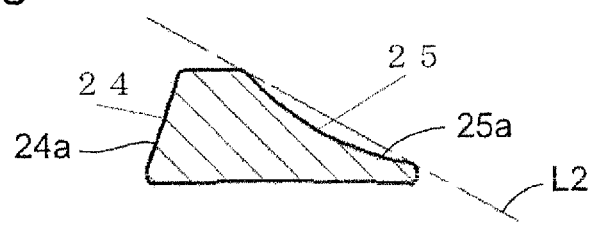
FIG. 5C is a cross-sectional view taken along a line g-g of FIG. 5A.
Figure 5D:
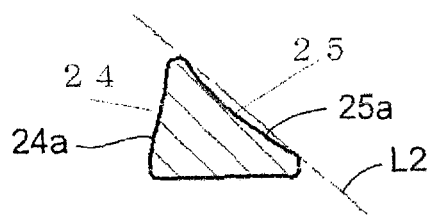
FIG. 5D is a cross-sectional view taken along a line h-h of FIG. 5A.
Figure 6:
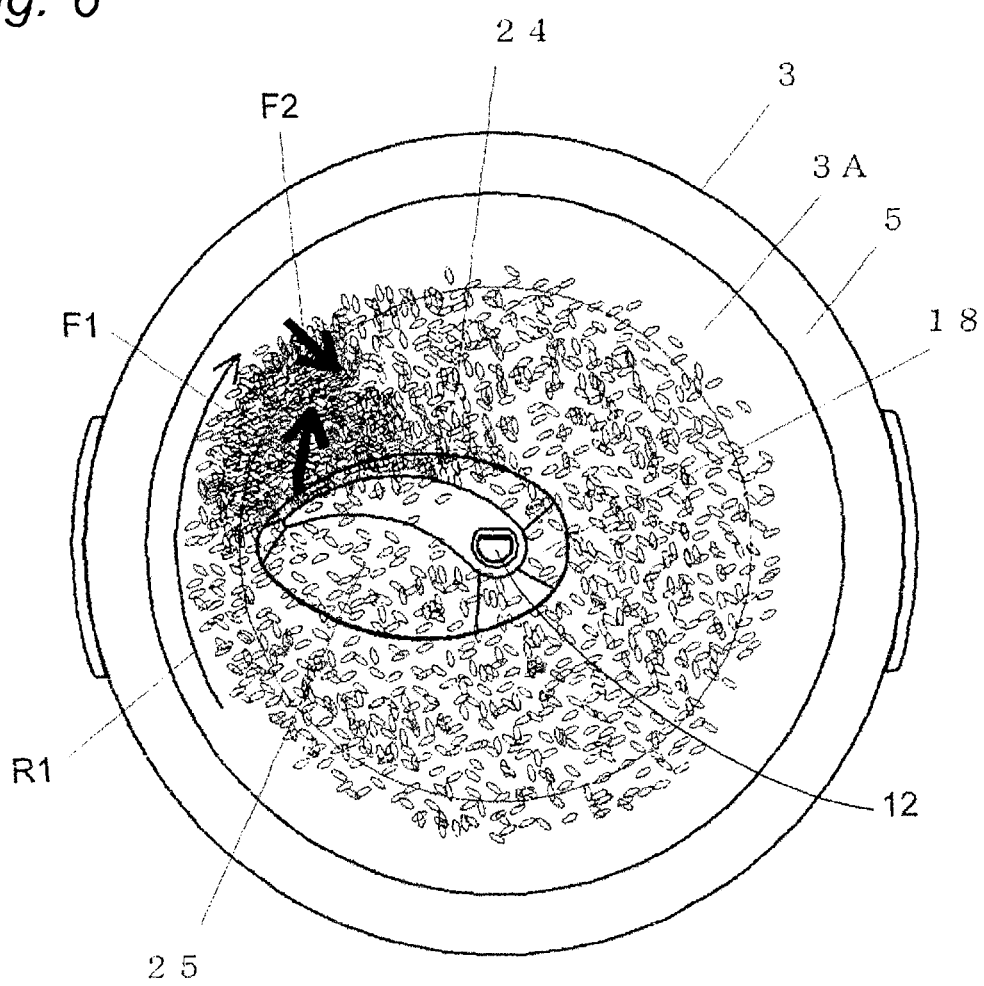
FIG. 6 is a schematic plan view of a state of a heating-target object when the blade is rotated in a first rotation direction in the heating cooker of FIG. 1.
Figure 7:
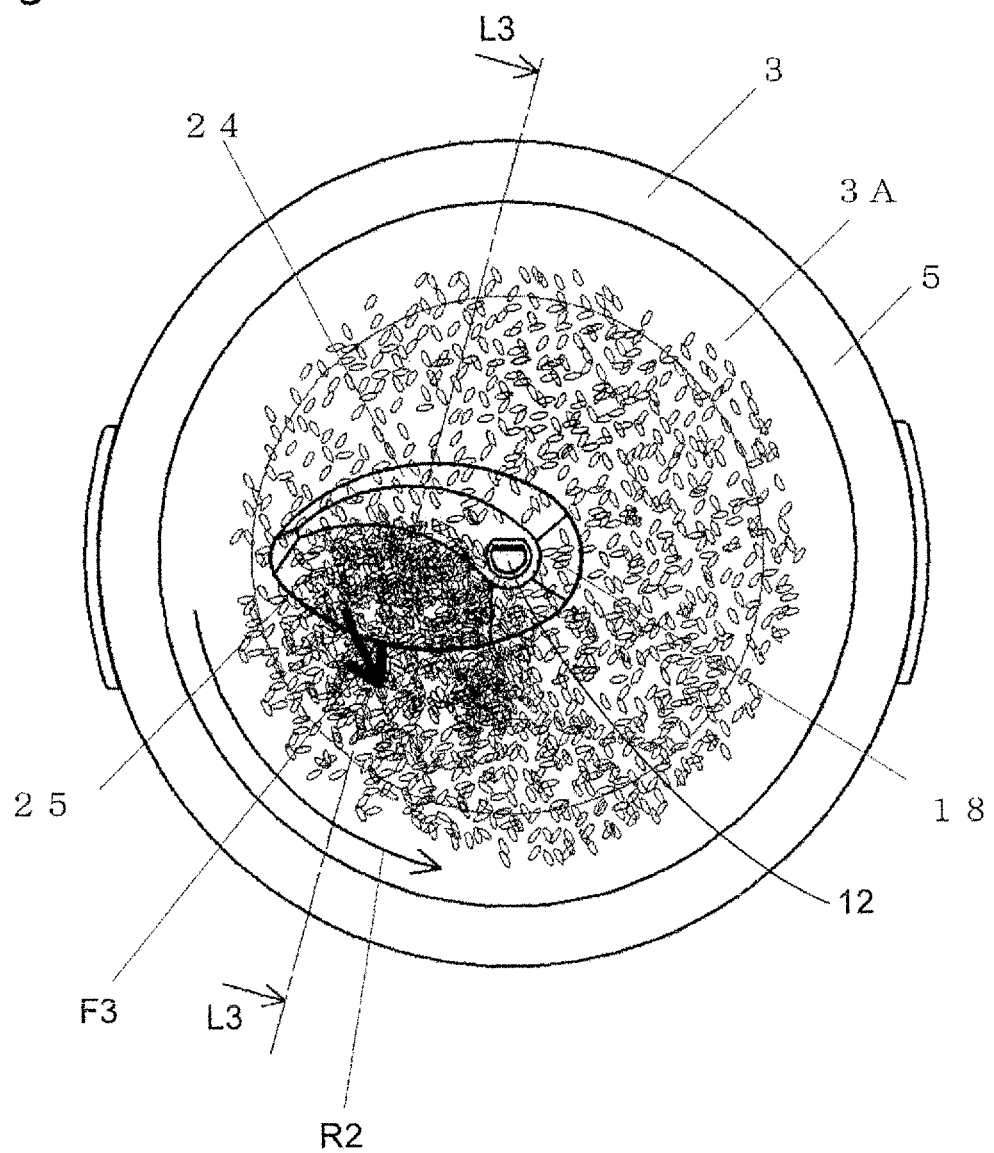
FIG. 7 is a schematic plan view of a state of the heating-target object when the blade is rotated in a second rotation direction in the heating cooker of FIG. 1.
Figure 8:
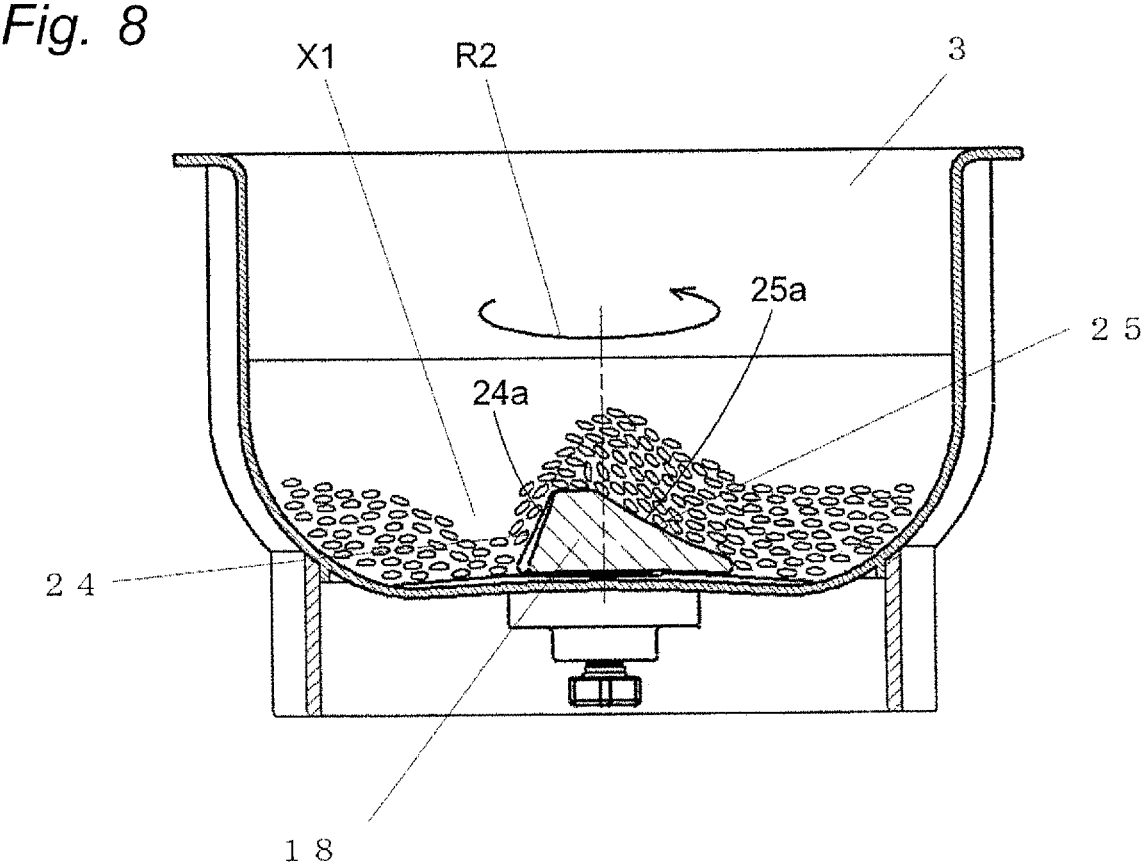
FIG. 8 is a cross-sectional view taken along a line L3-L3 of FIG. 7.

A specific configuration of the blade 18 will be described with reference to FIGS. 2 to 8. FIGS. 2 and 3 are perspective views of the blade 18. FIG. 4A is a side view of the blade 18. FIG. 4B is a cross-sectional view taken along a line c-c of FIG. 4A. FIG. 4C is a cross-sectional view taken along a line d-d of FIG. 4A. FIG. 4D is a cross-sectional view taken along a line e-e of FIG. 4A. FIG. 5A is a plan view of the blade 18. FIG. 5B is a cross-sectional view taken along a line f-f of FIG. 5A. FIG. 5C is a cross-sectional view taken along a line g-g of FIG. 5A. FIG. 5D is a cross-sectional view taken along a line h-h of FIG. 5A. FIG. 6 is a schematic plan view of a state of a heating-target object when the blade 18 is rotated in a first rotation direction R1. FIG. 7 is a schematic plan view of a state of the heating-target object when the blade 18 is rotated in a second rotation direction R2. FIG. 8 is a cross-sectional view taken along a line L3-L3 of FIG. 7.

As depicted in FIGS. 2 and 3, the blade 18 is configured to be rotatable in the first rotation direction R1 and the second rotation direction R2 around the rotation axle 12 in accordance with the forward and reverse rotation of the output shaft 14A of the rotation drive motor 14. The blade 18 includes a first functional portion 24 pressing the heating-target object toward a side wall 3A of the cooking container 3 when rotating in the first rotation direction R1. The blade 18 includes a second functional portion 25 pressing the heating-target object not toward the side wall 3A of the cooking container 3 when rotating in the second rotation direction R2. In this embodiment, the second functional portion 25 is configured to press the heating-target object toward a center region of the cooking container 3.

The first functional portion 24 and the second functional portion 25 are disposed on an upper portion of the blade 18 (i.e., a portion visually recognizable from above in a plane view). As depicted in FIGS. 4A to 4D, the upper portion of the blade 18 has a horizontal cross-sectional area made gradually smaller from the bottom to the top. In this embodiment, the upper portion of the blade 18 has a substantially elliptical frustum shape.

As depicted in FIGS. 4B to 4D, the first functional portion 24 of the blade 18 has a convex shape curved toward the front side (downstream side) in the first rotation direction R1 relative to a straight line L1 passing through the rotation axle 12 of the blade 18 and a rotation tip position 18A of the blade 18 in a planer view. The second functional portion 25 of the blade 18 has a concave shape curved toward the rear side (upstream side) in the second rotation direction R2 relative to the straight line L1.

As depicted in FIGS. 5B to 5D, the first functional portion 24 of the blade 18 has an inclined surface 24a having an inclination angle made gradually larger within a range of 45 to 90 degrees relative to the horizontal direction from the rotation axle 12 of the blade 18 toward the rotation tip position 18A of the blade 18. The second functional portion 25 of the blade 18 has an inclined surface 25a having an inclination angle made gradually smaller within a range of 0 to 60 degrees relative to the horizontal direction from the rotation axle 12 of the blade 18 toward the rotation tip position 18A of the blade 18 followed by the inclination angle made gradually lager and the inclination angle made drastically larger in the vicinity of the rotation tip position 18A (i.e., an increase rate of the inclination angle is increased as compared to near the rotation axle 12). The inclination angle of the second functional portion 25 may be equal to or greater than 45 degrees in the vicinity of the rotation tip position 18A.

As depicted in FIGS. 5B to 5D, the second functional portion 25 of the blade 18 has a concave shape curved toward the inside of the blade 18 relative to a straight line L2 connecting an upper end portion and a lower end portion in a vertical cross section orthogonal to a vertical cross section passing through the rotation axle 12 of the blade 18 and the rotation tip position 18A of the blade 18.

The operation at the time of rice cooking of the heating cooker according to the embodiment of the invention will be described.

The rice washing process will first be described.

A user mounts the blade 18 on the upper end portion of the rotation axle 12 penetrating the substantially center portion of the bottom wall 3B of the cooking container 3 and puts measured rice and water in an amount suitable for washing the rice into the cooking container 3 as a heating-target object.

The user places the cooking container 3 into the heating chamber 4 to engage the upper coupling 13 of the rotation axle 12 with the lower coupling 17 disposed in the device main body 1.

The user closes the lid 2 with the inner lid 10 mounted thereon. As a result, the heating cooker according to this embodiment is in the state depicted in FIG. 1.

When the user pushes the rice washing key disposed on the operation panel 26, the control unit 30 controls the rotation drive motor 14 to rotate the output shaft 14A in the forward direction. As a result, as depicted in FIG. 6, the blade 18 in the cooking container 3 rotates in the first rotation direction R1 and the first functional portion 24 presses the rice, i.e., the heating-target object, toward the side wall 3A of the cooking container 3. In this case, the one-way clutch 22 causes the second driven unit 21 to idle and only the first driven unit 20 transmits the rotating force to the rotation shaft 16. The rotation of the first driven unit 20 causes the blade 18 to rotate at a rotation speed of 150 to 300 rpm, for example.

The rice pressed by the first functional portion 24 of the blade 18 is pushed out along the inclined surface 24a of the first functional portion 24 toward the side wall 3A of the cooking container 3.

In this embodiment, as depicted in FIG. 1, the side wall 3A of the cooking container 3 includes a vertical portion and a curved portion. The rice pressed by the first functional portion 24 of the blade 18 is pushed out mainly toward the curved portion.

In this embodiment, the inclined surface 24a of the first functional portion 24 has an inclination angle of about 45 to 60 degrees relative to the horizontal direction in the vicinity of the rotation axle 12 and an inclination angle near 90 degrees relative to the horizontal direction in the vicinity of the rotation tip position 18A. Because of this inclined surface 24a, the rice is pushed out toward the side wall 3A of the cooking container 3 without being crushed.

As a result, as depicted in FIG. 6, a multiplicity of rice grains is gathered between the inclined surface 24a of the first functional portion 24 and the side wall 3A of the cooking container 3. To the multiplicity of the gathered rice grains, a force in the direction of an arrow F1 and a force in the direction of an arrow F2 are applied from the inclined surface 24a of the first functional portion 24 and the side wall 3A of the cooking container 3, respectively. These forces in the direction of the arrow F1 and the direction of the arrow F2 cause the rice grains to rub each other. As a result, the rice washing is performed.

If the blade 18 is rotated in the second rotation direction R2 instead of the first rotation direction R1, the rice is pressed by the inclined surface 25a of the second functional portion 25. In this case, because of the inclined surface 25a of the second functional portion 25, the rice moves upward along the inclined surface 25a. In this case, since the second functional portion 25 has the concave shape curved toward the rear side in the second rotation direction R2 in a plane view, the rice moves to the center region of the cooking container 3. This makes the force of rubbing the rice grains with each other weak and a considerable time is required for sufficiently washing the rice.

After completion of the rice washing by the rotation of the blade 18 in the first rotation direction R1, the user takes out the cooking container 3 from the device main body 1.

Subsequently, the user drains water in the cooking container 3 and then supplies water up to a water line (not depicted) printed inside the cooking container 3.

Subsequently, after mounting the cooking container 3 on the device main body 1 and selecting a desired rice cooking course on the operation panel 26, the user pushes a "rice cooking" button and the rice cooking process is then started.

Although rice is washed by the rotation of the blade 18 in the above description, rice may manually be washed. In this case, rice may be washed with the blade 18 attached to the cooking container 3. Since the upper portion of the blade 18 has a substantially elliptical frustum shape and therefore has no acute-angle portion, the blade 18 can be restrained from being caught by a hand when rice is manually washed. The substantially elliptical frustum shape of the upper portion of the blade 18 can restrain the blade 18 from being caught by a rice scoop and is therefore advantageous when rice is scooped by a rice scoop.

The rice cooking process will be described. The rice cooking process includes the water soaking process, the temperature raising process, a boiling maintaining process, and a steaming process. When the rice cooking process is started, the water soaking process is first started.

The water soaking process is a process of soaking rice in water at a temperature lower than the gelatinization temperature and cause the rice to absorb water in advance so that the rice can sufficiently be gelatinized to a center portion. In the water soaking process, the control unit 30 controls the induction heating coil 8 based on the detected temperature of the temperature sensor 23 such that after the temperature of water in the cooking container 3 is raised to near the gelatinization temperature of rice (e.g., 40° C. to 60° C.), the raised temperature is maintained.

In the water soaking process, the control unit 30 rotates the blade 18 in the second rotation direction R2 as depicted in FIG. 7. This causes the inclined surface 25a of the second functional portion 25 to press the rice in the direction of an arrow F3. In this case, the one-way clutch 22 causes the first driven unit 20 to idle and only the second driven unit 21 transmits the rotating force to the rotation shaft 16. The rotation of the second driven unit 21 causes the blade 18 to rotate at a rotation speed of 10 to 60 rpm, for example.

As depicted in FIG. 8, the rice pressed by the second functional portion 25 of the blade 18 is lifted upward along the inclined surface 25a of the second functional portion 25 and is pushed and gathered into the center region of the cooking container 3. On the other hand, an amount of rice decreases in the vicinity of the inclined surface 24a of the first functional portion 24 and a concave portion X1 is generated. As an amount of rice lifted by the second functional portion 25 to the center region of the cooking container 3 increases, the rice slips off to the concave portion X1. This phenomenon continuously occurs while the blade 18 rotates in the second rotation direction R2. As a result, convection is generated such that the rice in an upper layer sinks downward in the vicinity of the center region of the cooking container 3 while the rice in a lower layer rises upward in the vicinity of the side wall 3A of the cooking container 3. Therefore, the rice can sufficiently be stirred to suppress the occurrence of uneven water absorption by the rice and to equalize the temperature of the heating-target object in the cooking container 3.

If the blade 18 is rotated in the first rotation direction R1 instead of the second rotation direction R2, the rice is pressed by the inclined surface 24a of the first functional portion 24. In this case, since the first functional portion 24 has the convex shape curved toward the front side in the first rotation direction R1 in a plane view, the rice pressed by the inclined surface 24a is pushed and gathered toward the side wall 3A of the cooking container 3. On the other hand, the rice on the center region side of the cooking container 3 decreases. Therefore, the surface of the heating-target object in the cooking container 3 is concaved on the center region side and is raised near the side wall 3A. This results in the occurrence of uneven cooking in the temperature raising process and the boiling maintaining process. In contrast, when the blade 18 is rotated in the second rotation direction R2, the surface of the heating-target object in the cooking container 3 can be made substantially flat and the occurrence of uneven cooking can be suppressed in the temperature raising process and the boiling maintaining process.

When the time set in advance depending on the selected rice cooking course has elapsed from the start of the water soaking process, a shift is made to the temperature raising process.

The temperature raising process is a process of heating the cooking container 3 at a stretch over high heat to put water in the cooking container 3 into a boiling maintaining state (about 100° C.). In this temperature raising process, the control unit 30 controls the induction heating coil 8 and the sheath heater 9 to rapidly heat the cooking container 3 and put water in the cooking container 3 into the boiling state.

In this temperature raising process, the control unit 30 rotates the blade 18 in the second rotation direction R2 as depicted in FIG. 7 for a predetermined time (e.g., a few seconds) from the start of the temperature raising process. As a result, the temperature of the heating-target object in the cooking container 3 is equalized and a temperature rising rate of the heating-target object is improved. In this case, for example, the blade 18 is set to rotate at a rotation speed of 10 to 60 rpm.

When the predetermined time has elapsed from the start of the temperature raising process, the control unit 30 stops the rotation of the blade 18. While the blade 18 is stopped, surfaces of rice grains are gelatinized and the rice grains expand because of water absorption due to heating. This causes the rice grains to attach to each other and form a large lump. When the detection temperature of the temperature sensor 23 reaches about 100° C. due to the execution of the temperature raising process, a shift is made to the boiling maintaining process.

The boiling maintaining process is a process of maintaining the boiling state of water in the cooking container 3 and gelatinizing the starch of rice to increase a gelatinization degree to about 50 to 80%. In this boiling maintaining process, the control unit 30 controls the induction heating coil 8 and the sheath heater 9 to maintain the boiling state of water in the cooking container 3.

In this boiling maintaining process, the control unit 30 rotates the blade 18 in the second rotation direction R2 as depicted in FIG. 7 after a predetermined time has elapsed from the start of the boiling maintaining process. In this case, for example, the blade 18 is set to rotate at a rotation speed of 10 to 60 rpm for two to three minutes. Therefore, the large lump generated by the rice grains attaching to each other in the temperature raising process collapses as if a glacier collapses and turns into small lumps. A gap is generated between these small lumps. This gap acts as a passage of steam (so-called crab hole) improving an efficiency of steaming in the steaming process.

The small lumps are pressed by the inclined surface 25a of the second functional portion 25 and lifted upward along the inclined surface 25a due to the rotation of the blade 18 in the second rotation direction R2 and are pushed and gathered into the center region of the cooking container 3. Therefore, after the rotation of the blade 18 is stopped, the surface of the heating-target object has a shape with the center portion raised like a mountain. This shape is similar to a shape of the surface of the heating-target object when a loosening operation is performed with a rice scoop after completion of the rice cooking process.

Since the blade 18 is rotated in the boiling maintaining process, boiling bubbles generated between a lower portion of the blade 18 and the bottom wall 3B of the cooking container 3 can be moved upward above the rotation orbit of the blade 18. Therefore, the stirring of the heating-target object in the cooking container 3 can be facilitated in the vertical direction. The blade 18 is preferably rotated at a rotation speed equal to or less than half of that of the rice washing process. As a result, when increasingly softening as the boiling maintaining process proceeds, the rice can be restrained from being crushed by the blade 18.

Since water is continuously boiled in the boiling maintaining process, a large amount of steam of about 100° C. is generated. This steam is released through a steam discharge hole not depicted to the outside of the rice cooker. If almost all the water in the cooking container 3 disappears in this way, the temperature of the cooking container 3 rises higher than the boiling point of water. When the temperature sensor 23 detects that the temperature of the cooking container 3 reaches higher than the boiling point (e.g., to 130° C.), a shift is made to a steaming process.

The steaming process is a process of evaporating excess water by using remaining heat to raise the gelatinization degree of rice to near 100%. In this steaming process, the control unit 30 controls the induction heating coil 8 and the sheath heater 9 to heat the cooking container 3 each time the temperature of the cooking container 3 decreases to a certain temperature or less.

When the time set in advance depending on a rice cooking amount has elapsed from the start of the steaming process, the steaming process is terminated (thus, the rice cooking process is terminated).

The operation at the time of bread-making of the heating cooker according to the embodiment of the invention will be described.

A user mounts the blade 18 on the upper end portion of the rotation axle 12 penetrating the substantially center portion of the bottom wall 3B of the cooking container 3 and puts bread ingredients such as measured wheat, water, salt, sugar, and dry yeast into the cooking container 3 as a heating-target object.

The user places the cooking container 3 into the heating chamber 4 to engage the upper coupling 13 of the rotation axle 12 with the lower coupling 17 disposed in the device main body 1.

The user closes the lid 2. As a result, the heating cooker according to this embodiment is in the state depicted in FIG. 9. In this case, the inner lid 10 is not mounted on the lid 2.

Subsequently, after selecting a desired bread-making course on the operation panel, the user pushes a "bread-making" button and the bread-making process is started. The bread-making process includes a kneading process, a primary fermentation process, a degassing process, a final fermentation process, and a baking process. When the bread-making process is started, the kneading process is first started.

The kneading process is a process of kneading breadstuff to make bread dough. In the kneading process, the control unit 30 controls the rotation drive motor 14 to rotate the output shaft 14A in the forward direction. This causes the blade 18 in the cooking container 3 to rotate in the first rotation direction R1 and the first functional portion 24 presses the heating-target object such as wheat toward the side wall 3A of the cooking container 3. In this case, the one-way clutch 22 causes the second driven unit 21 to idle and only the first driven unit 20 transmits the rotating force to the rotation shaft 16. The rotation of the first driven unit 20 causes the blade 18 to rotate at a rotation speed of 150 to 300 rpm, for example.

The heating-target object pressed by the first functional portion 24 of the blade 18 is pushed out along the inclined surface 24a of the first functional portion 24 toward the side wall 3A of the cooking container 3. The pushed-out heating-target object is interposed and pressurized between the blade 18 and the side wall 3A of the cooking container 3. The heating-target object is kneaded by this pressure and bread dough having predetermined elasticity is made.

When a predetermined time has elapsed from the start of the kneading process, the primary fermentation process is started. The primary fermentation process is a process of fermenting bread dough. In the fermentation process, the control unit 30 controls the sheath heater 9 to maintain the temperature of the heating chamber 4 at a temperature allowing the fermentation to proceed (e.g., 28 to 30° C.). In this process, the control unit 30 stops the drive of the rotation drive motor 14 so as not to rotate the blade 18, thereby allowing the bread dough to rest. As a result, yeast absorbs sugar and releases gas and the bread dough expands.

After a predetermined time has elapsed from the primary fermentation process, a shift is made to the degassing process. The degassing process is a process of removing the gas in the expanded bread dough. In the degassing process, the control unit 30 controls the rotation drive motor 14 to rotate the output shaft 14A in the revere direction. This causes the blade 18 in the cooking container 3 to rotate in the second rotation direction R2 and the second functional portion 25 presses the bread dough, i.e., the heating-target object. In this case, the one-way clutch 22 causes the first driven unit 20 to idle and only the second driven unit 21 transmits the rotating force to the rotation shaft 16. The rotation of the second driven unit 21 causes the blade 18 to rotate at a rotation speed of 10 to 60 rpm, for example.

The bread dough pressed by the second functional portion 25 of the blade 18 is lifted upward along the inclined surface 25a of the second functional portion 25 and is pushed and gathered into the center region of the cooking container 3. As a result, the gas in the bread dough is removed and the bread dough is deflated and rolled.

If the blade 18 is rotated in the first rotation direction R1 instead of the second rotation direction R2 in the degassing process, the bread dough is pressed by the first functional portion 24 toward the side wall 3A of the cooking container 3. Also in this case, the bread dough is interposed and pressurized between the blade 18 and the side wall 3A of the cooking container 3 and, therefore, the gas in the bread dough can be removed. However, a force tends to be applied in this case such that the bread dough is stretched out. Therefore, gluten formed in the bread dough is torn off, which may result in badly made bread.

When the fermentation process and the degassing process are alternately repeated multiple times and, for example, the volume of the bread dough is increased about twice, a shift is made to the final fermentation process. The final fermentation process is a process of expanding the bread dough by fermentation to achieve a state of the bread dough suitable for performing the next baking process. In the final fermentation process, the control unit 30 controls the sheath heater 9 to maintain the temperature of the heating chamber 4 at a temperature allowing the fermentation to proceed (e.g., 33 to 35° C.).

After a predetermined time has elapsed from the final fermentation process, the baking process is started. The baking process is a process of baking the fermented bread dough to make bread. In the baking process, the control unit 30 controls the sheath heater 9 to rise the temperature in the cooking container 3 to an atmosphere temperature suitable for baking bread (e.g., about 200° C.).

When a predetermined time has elapsed from the start of the baking process, the baking process is terminated. As a result, the entire bread-making process is completed.

The heating cooker according to this embodiment can switch the rotation direction of the blade 18 to switch whether the heating-target object is pressed toward the side wall 3A of the cooking container 3. Therefore, if a strong force must be applied to the heating-target object as in the case of the kneading process and the rice washing process, the heating-target object can be pressed by the first functional portion 24 toward the side wall 3A of the cooking container 3 and can be moved to between the side wall 3A of the cooking container 3 and the blade 18. As a result, a strong pressure can be applied to the heating-target object. On the other hand, if the heating-target object may be damaged as in the case of the degassing process and the temperature raising process, the heating-target object can be pressed by the second function unit 25 not toward the side wall 3A of the cooking container 3 so as not to apply a strong pressure to the heating-target object. This enables the suppression of damage of the heating-target object due to the rotation of the blade 18.

Since the heating cooker according to this embodiment has the rotation ratios of the first and second driven units 20, 21 differentiated from each other, the rotation speed of the blade 18 can be switched simply by switching the rotation direction of the blade 18 without using an expensive motor such as an inverter motor. As a result, an inexpensive motor such as an induction motor can be used as the rotation drive motor 14 to suppress component costs.

Although the blade 18 is rotated in the second rotation direction R2 in the water soaking process, the temperature raising process, and the boiling maintaining process during rice cooking in this embodiment, the invention is not limited thereto. Since the heating cooker according to this embodiment can suppress the damage of rice due to the rotation of the blade 18, the blade 18 may be rotated in the second rotation direction R2 in the steaming process and a loosening process for loosening rice after completion of the rice cooking process. In this case, the rotation speed of the blade 18 in the steaming process and the loosening process may be set to the same rotation speed as the water soaking process, the temperature raising process, and the boiling maintaining process (e.g., 10 to 60 rpm).

Although the blade 18 is rotated in the second rotation direction R2 in the three processes of the water soaking process, the temperature raising process, and the boiling maintaining process during rice cooking in this embodiment, the invention is not limited thereto. The blade 18 may be rotated in the second rotation direction R2 in any one process of the water soaking process, the temperature raising process, the boiling maintaining process, the steaming process, and the loosening process.

Although the both processes of rotating the blade 18 in the first rotation direction R1 and in the second rotation direction R2 are performed at the time of rice cooking and at the time of bread-making in this embodiment, the invention is not limited thereto. At the time of bread-making, a strong force is required for kneading bread dough. On the other hand, in the rice cooking process, it is necessary to refrain from applying an excessive force so as not to damage rice grains. Therefore, the blade 18 may be rotated in the first rotation direction R1 at the time of bread-making and the blade 18 may be rotated in the second rotation direction R2 at the time of rice cooking. In this case, at the time of bread-making when the blade 18 is rotated in the first rotation direction R1, the rotation speed of the blade 18 may be set to 200 to 400 rpm, for example. Also in this case, the rotation drive motor 14 may continuously be driven in the kneading process and the rotation drive motor 14 may intermittently be driven in the degassing process. On the other hand, at the time of rice cooking when the blade 18 is rotated in the second rotation direction R2, the rotation speed of the blade 18 may be set to 30 to 60 rpm, for example. Also in this case, the rotation drive motor 14 may continuously be driven in the rice washing process and the rotation drive motor 14 may intermittently be driven in the other processes.

Although the heating cooker according to this embodiment has both the rice cooking function and the bread-making function, the invention is not limited thereto and the heating cooker may have either one of the functions.

If the heating cooker according to this embodiment has only the rice cooking function, the rotation speed of the blade 18 may be set to, for example, 40 to 70 rpm in the rice washing process when the blade 18 is rotated in the first rotation direction R1. On the other hand, the rotation speed of the blade 18 may be set to, for example, 5 to 30 rpm in at least any one of the water soaking, temperature rising, boiling maintaining, steaming, and loosening processes when the blade 18 is rotated in the second rotation direction R2.

If the heating cooker according to this embodiment has only the bread-making function, the rotation speed of the blade 18 may be set to, for example, 200 to 400 rpm in the kneading process when the blade 18 is rotated in the first rotation direction R1. On the other hand, the rotation speed of the blade 18 may be set to, for example, 50 to 200 rpm in the degassing process when the blade 18 is rotated in the second rotation direction R2.

A preferable shape of the lower portion of the blade 18 (i.e., a portion visually recognizable from under in a plane view) will be described.

Figure 10:
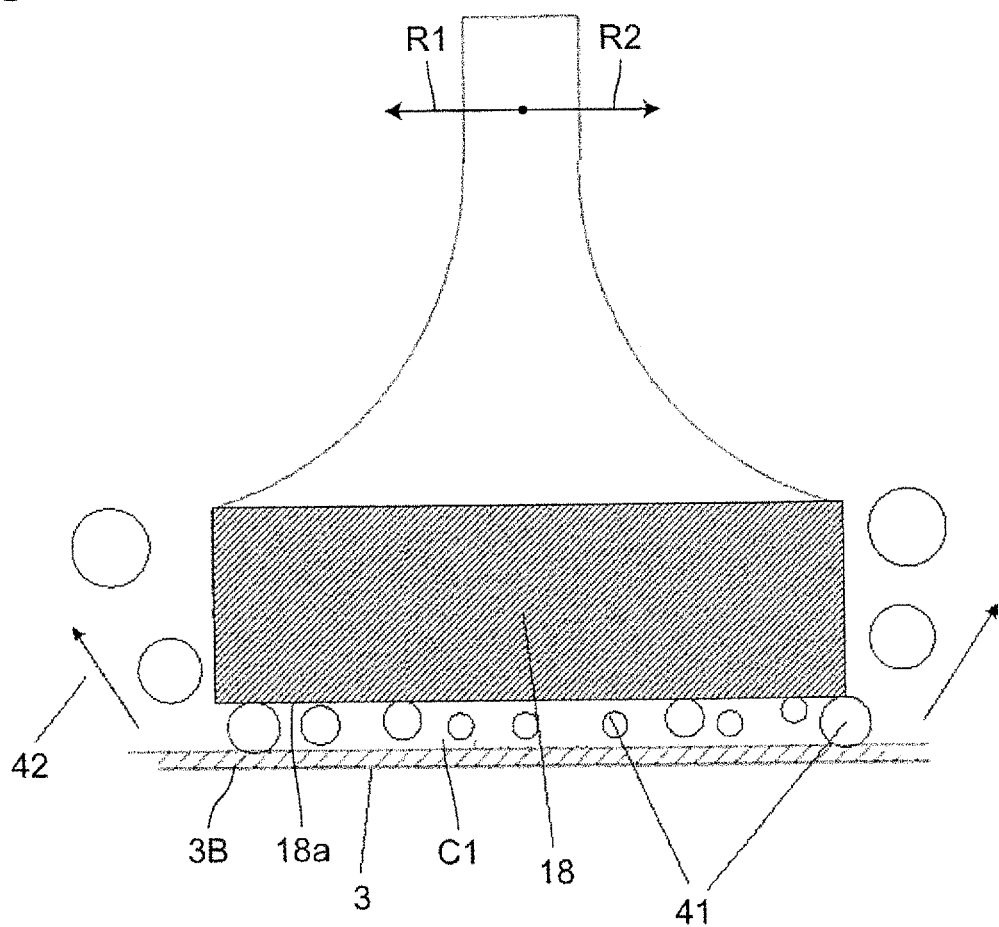
FIG. 10 is a vertical cross-sectional view of a state in which air bubbles are generated in a gap between the blade and a bottom wall of a cooking container because of boiling of water in the cooking container at the time of rice cooking.

FIG. 10 is a vertical cross-sectional view of a state in which air bubbles 41 are generated in a gap C1 between the blade 18 and the bottom wall 3B of the cooking container 3 because of boiling of water in the cooking container 3 at the time of rice cooking. In the drawing, for convenience of description, portions corresponding to the first functional portion 24 and the second functional portion 25 are horizontally symmetrically depicted.

For example, a large amount of water is present in the cooking container 3 in the water soaking process, the temperature raising process, and the boiling maintaining process, and the air bubbles 41 are generated by heating the water. As depicted in FIG. 10, if a lower portion 18a of the blade 8 is a flat surface, the air bubbles 41 generated in the gap C1 between the blade 18 and the bottom wall 3B of the cooking container 3 accumulate in the gap C1 immediately after being generated. Subsequently, as the heating is continued, the size of the air bubbles 41 gradually becomes larger. When the air bubbles 41 reach a certain size, the air bubbles 41 pass through the gap C1 and are released toward an upper portion of the cooking container 3 as indicated by an arrow 42 due to buoyancy. When the air bubbles 41 are released toward the upper portion of the cooking container 3, water is shaken around a portion through which the air bubbles 41 pass, and enters the pass-through portion. Therefore, the movement of the air bubbles 41 is slow in the gap C1 as compared to the other portions and water tends to remain. As a result, when the rice cooking is completed, an amount of water tends to be larger in the rice around the gap C1 as compared to the other portions, leading to occurrence of uneven cooking.

Figure 11:
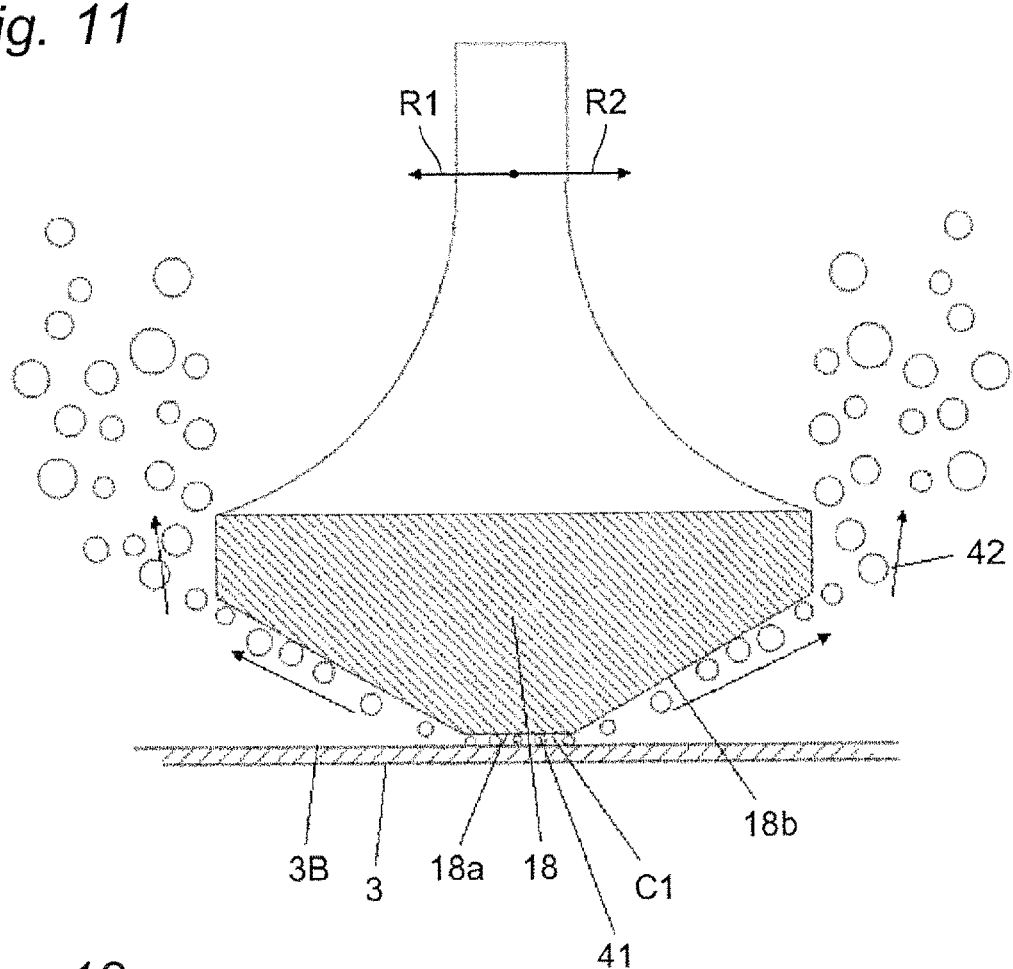
FIG. 11 is a vertical cross-sectional view of a first modification of the blade.

Therefore, as depicted in FIG. 11, the lower portion of the blade 18 facing the bottom wall 3B of the cooking container 3 is preferably configured to incline such that a distance from the bottom wall 3B of the cooking container 3 increases toward the outer circumferential portion. Thus, the air bubbles 41 generated in the gap C1 move upward along an inclined surface 18b due to buoyancy and are released before the size becomes larger. As a result, the occurrence of uneven cooking can be suppressed.

Figure 12:
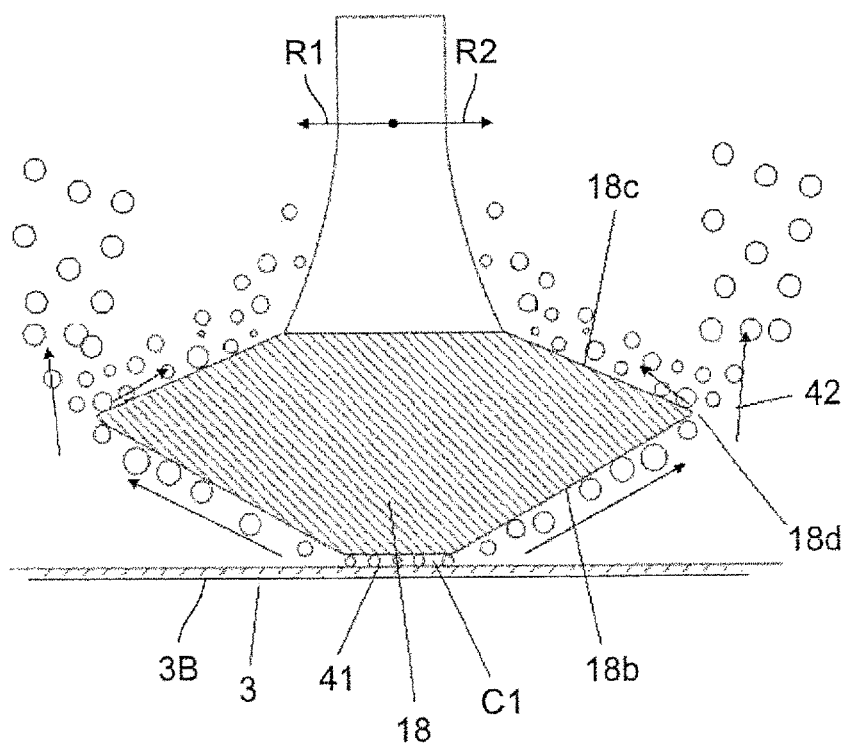
FIG. 12 is a vertical cross-sectional view of a second modification of the blade.

As depicted in FIG. 12, the upper portion of the blade 18 is preferably connected to the lower portion of the blade 18 through an inclined surface inclined downward relative to the horizontal direction. Thus, when moving along the inclined surface 18b and reaching a connection portion 18d between the inclined surface 18b and the inclined surface 18c, the air bubbles 41 can be guided such that the air bubbles also flow on the upper side of the inclined surface 18c. As a result, the air bubbles can more uniformly be distributed in the cooking container 3 and the occurrence of the uneven cooking can further be suppressed.

Figure 13:
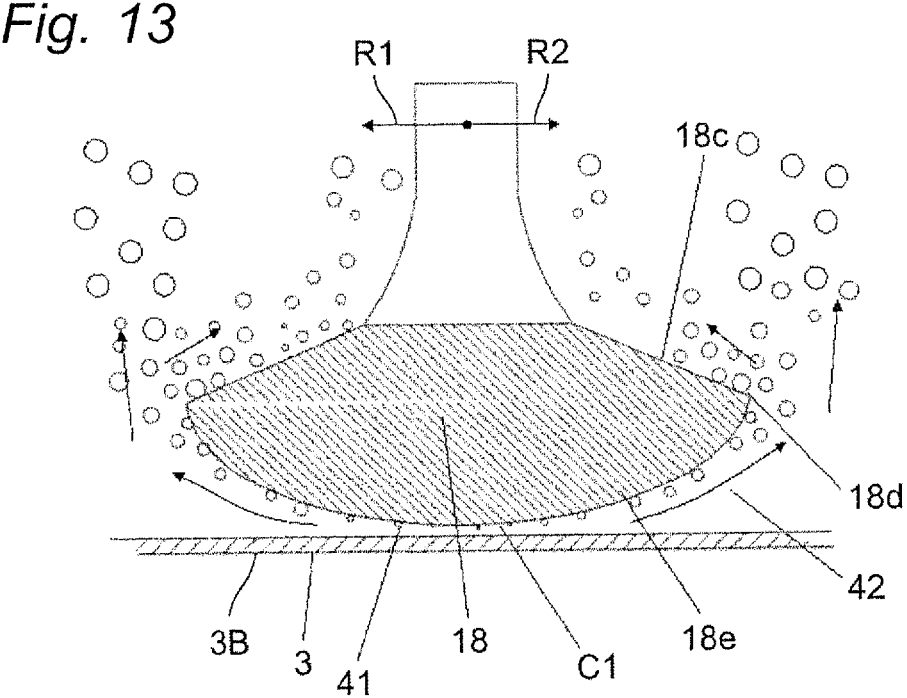
FIG. 13 is a vertical cross-sectional view of a third modification of the blade.

As depicted in FIG. 13, the lower portion of the blade 18 facing the bottom wall 3B of the cooking container 3 may be formed to curve such that a distance from the bottom wall 3B of the cooking container 3 increases toward the outer circumferential portion. Thus, the air bubbles 41 generated in the gap C1 move upward along a curved surface 18e due to buoyancy and are released before the size becomes larger. As a result, the occurrence of uneven cooking can be suppressed.

Although FIGS. 11 to 13 depict the lower portion of the blade 18 inclining or curving such that a distance from the bottom wall 3B of the cooking container 3 increases toward the upstream side and the downstream side in the rotation direction, the invention is not limited thereto. The lower portion of the blade 18 may be formed to incline or curve such that a distance from the bottom wall 3B of the cooking container 3 increases from the rotation axle 12 of the blade 18 toward the rotation tip position 18A of the blade 18.

Although FIGS. 11 to 13 depict a large inclination angle of the lower portion of the blade 18, if the inclination angle is made larger, a large amount of the heating-target object enters the gap C1 and the heating-target object may be crushed. Therefore, the inclination angle may be several degrees.

The retention of the air bubbles 41 in the gap C1 can also be suppressed by rotating the blade 18. Therefore, the blade 18 may be rotated in the processes associated with the generation of the air bubbles 41, for example, the water soaking process, the temperature raising process, and the boiling maintaining process. This enables further suppression of the occurrence of uneven cooking.

Although the invention has been fully described in connection with the preferred embodiment thereof with reference to the accompanying drawings, it is to be noted that various changes and modifications are apparent to those skilled in the art. Such modifications and corrections are to be understood as included within the scope of the invention as defined by the appended claims unless they depart therefrom.

The entire disclosure of Japanese Patent Application No. 2013-078289 filed on Apr. 4, 2013 and Japanese Patent Application Nos. 2013-197771 and 2013-197772 filed on Sep. 25, 2013 including specification, drawing, and claims are incorporated herein by reference in its entirety.

INDUSTRIAL APPLICABILITY

The heating cooker according to the invention can suppress damage of a heating-target object due to rotation of a blade and is therefore useful as a heating cooker stirring and cooking a heating-target object such as a rice cooker, an automatic bread maker, a multifunctional cooker having both a rice cooking function and a bread-making function.

What is claimed is:

1. A heating cooker comprising:
    a cooking container housed in a heating chamber inside a device main body; and
    a single blade connected to a rotation axle of a reversible rotation drive motor through an opening therein and rotating in first and second rotation directions around the rotation axle in the cooking container to stir a heating-target object put in the cooking container,
    the single blade including a first functional portion pressing the heating-target object toward a side wall of the cooking container when rotating in the first rotation direction, and a second functional portion pressing the heating-target object not toward the side wall of the cooking container when rotating in the second rotation direction,
    wherein the first functional portion has an inclined surface having an inclination angle progressing gradually larger relative to a horizontal direction from the rotation axle of the single blade toward a rotation tip position of the single blade, and
    the second functional portion on an opposite side of the single blade from the first functional portion and having an inclined surface having a concave shape curved toward an inside of the single blade relative to a straight line connecting an upper end portion and a lower end portion as seen in a vertical cross section,
    wherein a rotational inclination angle of the second functional portion in the horizontal direction as seen in a plan view progresses gradually smaller from the rotation axle of the single blade toward the rotation tip position and then progress gradually larger in the direction toward the rotation tip position, such that a rate of change of inclination increases at the rotation tip position,
    wherein the single blade has a flat upper surface having a horizontal surface area progressing gradually smaller from the rotation axle to the rotation tip position.

2. The heating cooker of claim 1, wherein the second functional portion is configured to press the heating-target object toward a center region of the cooking container.

3. The heating cooker of claim 1, wherein the upper surface of the single blade has a substantially elliptical frustum shape.

4. The heating cooker of claim 1, wherein the first functional portion has a convex shape curved toward a front side in the first rotation direction relative to a straight line passing through the rotation axle of the single blade and the rotation tip position of the single blade in a plane view.

5. The heating cooker of claim 1, wherein the inclination angle of the first functional portion progresses gradually larger within a range of 45 to 90 degrees relative to a horizontal direction from the rotation axle of the blade toward the rotation tip position of the single blade.

6. The heating cooker of claim 1, wherein the rotational inclination angle of the inclined surface of the second functional portion progresses gradually smaller within a range of 0 to 60 degrees relative to the horizontal direction from the rotation axle of the blade toward the second portion of the inclined surface.

7. The heating cooker of claim 1, wherein the single blade is configured to rotate in the first rotation direction in a rice washing process and to rotate in the second rotation direction in at least one process of a water soaking process, a temperature raising process, a boiling maintaining process, a steaming process, and a loosening process after completion of rice cooking.

8. The heating cooker of claim 1, wherein the single blade is configured to rotate in the first rotation direction in a kneading process and to rotate in the second rotation direction in a degassing process.

9. The heating cooker of claim 1, wherein the single blade is configured to rotate in the first rotation direction at a time of bread-making and to rotate in the second rotation direction at a time of rice cooking.

10. The heating cooker of claim 1, further comprising:
a rotation shaft coupled to the rotation axle of the single blade;
first and second driven units having rotation ratios different from each other, rotating in the first rotation direction when an output shaft of the rotation drive motor rotates in a forward direction, and rotating in the second rotation direction when the output shaft of the rotation drive motor rotates in a reverse direction;
a first one-way clutch transmitting a rotating force of the first driven unit to the rotation shaft when the first driven unit rotates in the first rotation direction and transmitting no rotating force of the first driven unit to the rotation shaft when the first driven unit rotates in the second rotation direction; and
a second one-way clutch transmitting no rotating force of the second driven unit to the rotation shaft when the second driven unit rotates in the first rotation direction and transmitting a rotating force of the second driven unit to the rotation shaft when the second driven unit rotates in the second rotation direction.

11. The heating cooker of claim 10, wherein the first driven unit includes a small-diameter pulley attached via the first one-way clutch to the rotation shaft, such that a drive force of the rotation drive motor is transmitted via a drive belt around a pulley attached to the output shaft of the rotation drive motor and the small-diameter pulley, and wherein the second driven unit includes a large-diameter pulley attached via the second one-way clutch to the rotation shaft, such that a drive force of the rotation drive motor is transmitted via a drive belt around a pulley attached to the output shaft of the rotation drive motor and the large-diameter pulley.

12. The heating cooker of claim 1, wherein a lower portion of the single blade facing a bottom wall of the cooking container is configured to incline or curve such that a distance from the bottom wall of the cooking container increases toward an outer circumferential portion of the single blade.

13. The heating cooker of claim 12, wherein an upper portion of the single blade is connected to the lower portion of the single blade through a portion inclined downward relative to a horizontal direction.

* * * * *